Patented Feb. 10, 1931

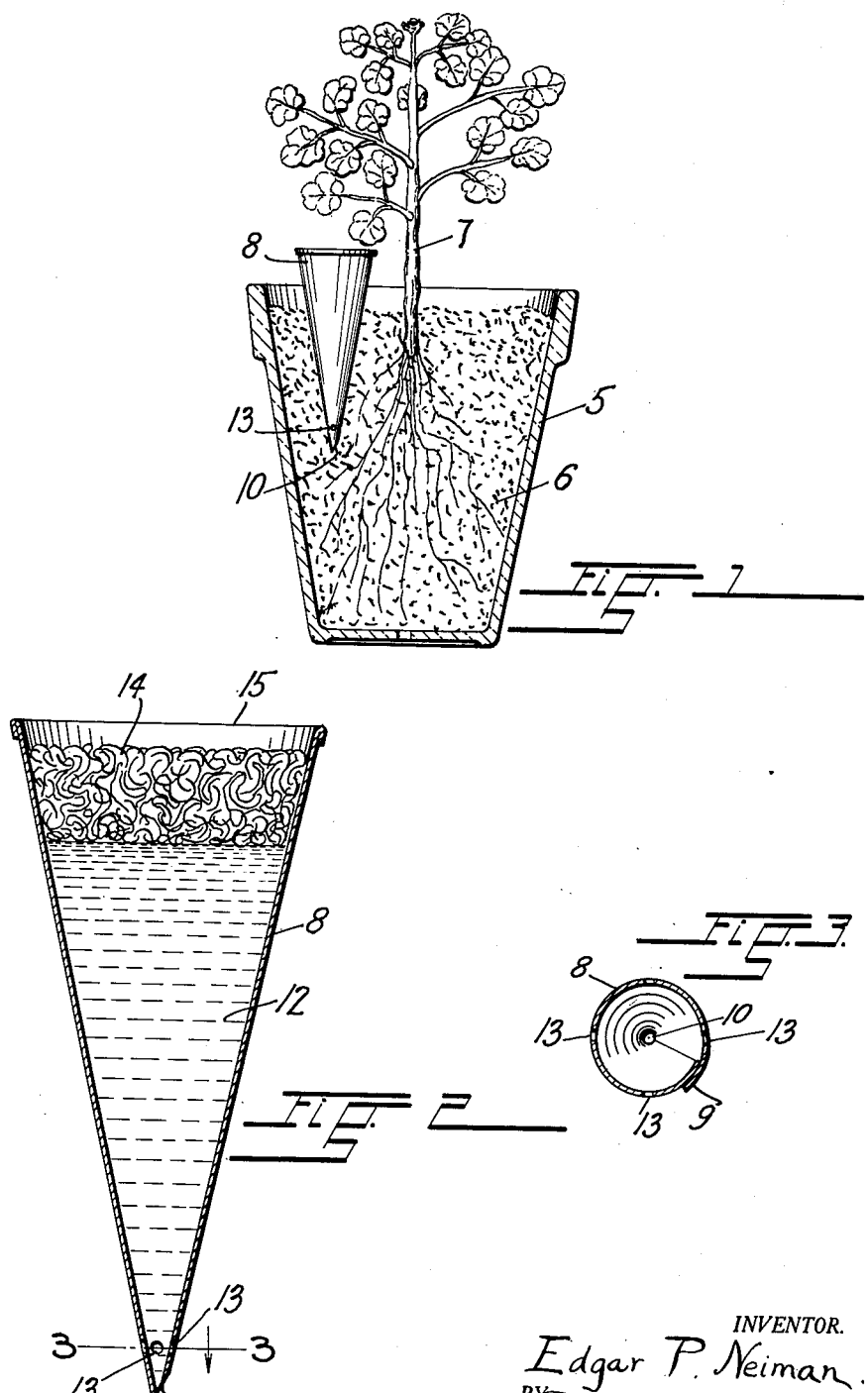

1,791,873

UNITED STATES PATENT OFFICE

EDGAR P. NEIMAN, OF DENVER, COLORADO

IRRIGATING DEVICE

Application filed April 16, 1927. Serial No. 184,306.

My invention relates to irrigating devices and the principal object is to have an irrigating device that will provide a constant supply of moisture to a nearby plant over a considerable period of time.

Another object is to provide a device that may be inserted in the soil around a potted plant or in the soil of a plant bed, so that the plant or plants adjacent thereto will receive moisture for a considerable period, as stated.

A still further object consists in providing means in a device of the character mentioned that will keep water in the device even though same is not held in a vertical plane at all times.

Further objects of the invention will be brought out in the course of the following description, as for instance, details of construction.

In the accompanying drawings, in which like parts are similarly designated in the various views, Figure 1 represents a sectional view of a pot containing earth, a plant, and the irrigating device referred to, Figure 2, an enlarged longitudinal section of the irrigating device, and Figure 3, an enlarged sectional view taken on the line 3—3 of Figure 2.

Referring more specifically to the drawings the numeral 5 represents the pot containing earth 6 and a plant 7.

The irrigating device consists of a container 8 of any suitable material, and preferably of conical shape with a large filler opening. The container shown is made of a single piece of material lapping as at 9 with the ends or lapping portions soldered together or otherwise fastened. The point of the cone is preferably sharp for insertion in the ground, and may have an opening 10 by which water 12 in the container is allowed to seep out and enter the surrounding earth. One or more further openings 13 may be provided in the wall of the container. Four such openings have been shown in the drawings, as best shown in Figure 3; this number has been found to give satisfactory results, but this, of course, is arbitrary.

For ordinary use in a greenhouse, a closure for the container is generally not necessary, but for transportation, especially in shipping, a closure 14 may be provided. The closure shown is a layer of moss near the large open end 15 of the container.

A closure that is not airtight but is to some extent waterproof is desired. Moss answers such a description and as it is generally available in a greenhouse is preferable to use.

An air tight cap on the container would cause a partial vacuum in the upper part of the container and prevent the water from seeping out through the openings at the opposite end. However, some sort of closure is advisable, for in wrapping a potted plant, it is generally laid on its side for a short time and the water in the container would be spilled in such an operation if no closure were present. In shipping, jolts on the plant would cause the water in the container to be splashed out if some sort of closure is not present.

The use of the present invention is believed to be apparent. As shown in Figure 1, the device is put in the earth adjoining a plant, either in a plant bed or in a pot. The water in the container gradually seeps out through the openings in the container and keeps the earth around the plant in a moist condition.

After inserting the device into the earth to the proper depth, it has been found advisable to give it a partial turn to prevent the compressed earth that is just entering the openings from clogging the same.

It is to be understood that I do not wish to limit myself to the exact construction shown, except as specifically stated in the hereunto appended claims. Changes may of course be made in the device without departing from the spirit of the invention.

Having thus described my invention, what I claim and desire to secure by Letters Patent is:—

1. An irrigating device comprising a container having a filler opening and an outlet opening, a body of water in the container, and a body of moss below the filler opening.

2. An irrigating device comprising a container having a filler opening and an outlet opening, and a body of moss between the openings.

3. An irrigating device comprising a container having filler and outlet openings, a body of liquid in the container, and a body of moss between the liquid and the filler opening.

4. An irrigating device comprising a container open at its ends and adapted to be inserted in soil adjacent to a plant, and a closure in the container, defining a water space between the ends, the closure being capable of obstructing the egress of water at one of the ends and being permeable to allow of the ingress of air to the water space at the same end.

In testimony whereof I have affixed my signature.

EDGAR P. NEIMAN.